United States Patent
Fraley et al.

(10) Patent No.: US 7,390,969 B2
(45) Date of Patent: Jun. 24, 2008

(54) WIRE HARNESS GROMMET

(75) Inventors: Josh D. Fraley, South Lyon, MI (US);
Scott L. Frederick, Brighton, MI (US);
Mark A. Zeilinger, Pinckney, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/671,870

(22) Filed: Feb. 6, 2007

(65) Prior Publication Data

US 2007/0181332 A1   Aug. 9, 2007

Related U.S. Application Data

(60) Provisional application No. 60/765,648, filed on Feb. 6, 2006.

(51) Int. Cl.
*H02G 3/04* (2006.01)
(52) U.S. Cl. .................. 174/72 A; 174/650; 174/153 G; 16/2.1; 16/2.2
(58) Field of Classification Search .............. 174/650, 174/153 G, 152 G, 135, 152 R, 142, 72 A, 174/652, 656, 665, 668, 669; 16/2.1, 2.2; 439/604, 587, 274, 275; 248/56; D8/400
See application file for complete search history.

(56) References Cited

U.S. PATENT DOCUMENTS

| | | | |
|---|---|---|---|
| 2,115,098 A | | 4/1938 | Engholm |
| 2,922,836 A | * | 1/1960 | Brown ................. 174/153 G |
| 4,169,218 A | | 9/1979 | Tyler |
| 4,326,100 A | | 4/1982 | Polacsek |
| 5,414,229 A | | 5/1995 | Rocheleau et al. |
| 5,716,044 A | * | 2/1998 | Peterson et al. ........... 174/72 A |
| 5,739,475 A | * | 4/1998 | Fujisawa et al. ........ 174/153 G |
| 5,856,635 A | * | 1/1999 | Fujisawa et al. ........ 174/153 G |
| 6,297,457 B1 | * | 10/2001 | Yamada et al. .......... 174/152 G |
| 6,349,142 B1 | | 2/2002 | Teng |
| 6,456,722 B1 | | 9/2002 | Davey et al. |
| 6,479,748 B2 | | 11/2002 | Mori |
| 6,577,741 B1 | | 6/2003 | Basore |
| 6,600,104 B2 | | 7/2003 | Nakata et al. |
| 6,603,078 B2 | * | 8/2003 | Okuhara et al. ......... 174/153 G |
| 6,815,615 B1 | * | 11/2004 | Haulotte et al. ............... 16/2.1 |
| 6,825,416 B2 | | 11/2004 | Okuhara |
| 7,098,401 B1 | * | 8/2006 | Herald et al. .................. 16/2.1 |
| 7,098,402 B2 | * | 8/2006 | Suzuki ................... 174/152 G |
| 2002/0081980 A1 | | 6/2002 | Reus |

(Continued)

FOREIGN PATENT DOCUMENTS

JP       06168640       6/1994

*Primary Examiner*—Angel R Estrada
(74) *Attorney, Agent, or Firm*—Gifford, Krass, Sprinkle, Anderson & Citkowski, P.C.

(57) ABSTRACT

A wire harness grommet assembly includes a sheet metal panel having a speaker hole and a grommet for supporting a wire harness from an audio speaker disposed in the speaker hole. The sheet metal panel has an emboss formed along a peripheral edge of the speaker hole. The grommet has an extension portion and an attachment portion. The extension portion has a tube for supporting the wire harness therein. The attachment portion is disposed within the emboss so that an outer surface of the attachment portion is substantially continuous with an outer surface of the sheet metal panel.

10 Claims, 3 Drawing Sheets

U.S. PATENT DOCUMENTS

2003/0102143 A1 6/2003 Sato et al.
2004/0094358 A1 5/2004 Peng
2004/0120541 A1 6/2004 Maekawa et al.
2006/0088172 A1 4/2006 Takayama et al.

* cited by examiner

WIRE HARNESS GROMMET

REFERENCE TO RELATED APPLICATIONS

This application claims priority to U.S. provisional patent application Ser. No. 60/765,648, which was filed Feb. 6, 2006 and is incorporated herein by reference in its entirety.

FIELD OF THE INVENTION

The invention relates to a grommet for routing a wire harness through a sheet metal part. More particularly, the invention relates to a grommet that seats in an emboss adjacent an opening in the sheet metal part and allows the wire harness to be routed therethrough.

BACKGROUND OF THE INVENTION

Automotive vehicles generally include vehicle doors having a multitude of wires or wiring harnesses routed from inside the door between tie inner and outer panels to an inboard side of an inner panel to power various structures such as the window, speakers or other systems. An existing problem includes the routing outlined above while maintaining a water seal and keeping the complexity of the wire routing to an acceptable level. In general, the routing structure must keep the correct drip loop structure for the harness and maintain minimum clearances to the other parts contained within the door.

Standard door routings include wire harnesses that route from the cabin to the door through a grommet along the inside of the door and exiting through a service hole near the center or rear of the door. However, packaging considerations and conditions may require different wiring routes to accommodate wire harnesses having a large doubled-over drip loop. Additionally, forming larger holes in the door to accommodate the large wiring harnesses may often not be an option due to the requirement to maintain specific rigidity and packaging requirements of the door components.

SUMMARY OF THE INVENTION

According to one aspect of the invention, a wire harness grommet assembly includes a sheet metal panel and a grommet. The sheet metal panel has a speaker hole for supporting a speaker therein. The sheet metal panel has an emboss formed on a peripheral edge of the speaker hole. The grommet has an extension portion and an attachment portion. The extension portion has a tube for supporting therein a wire harness from the speaker. The attachment portion is disposed within the emboss so that an outer surface of the attachment portion is substantially continuous with an outer surface of the sheet metal panel.

According to another aspect of the invention, a wire harness grommet is provided for supporting a wire harness from an audio speaker in a vehicle, wherein the speaker is disposed in a speaker hole formed in a sheet metal panel in the vehicle. The wire harness grommet includes an extension portion having a tube that receives the wire harness from the audio speaker therethrough. The wire harness grommet also includes an attachment portion that is adapted to be secured along a peripheral edge of the speaker hole. The attachment portion has a pair of outwardly extending arms that extends between the sheet metal panel and the audio speaker to form a seal therebetween.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
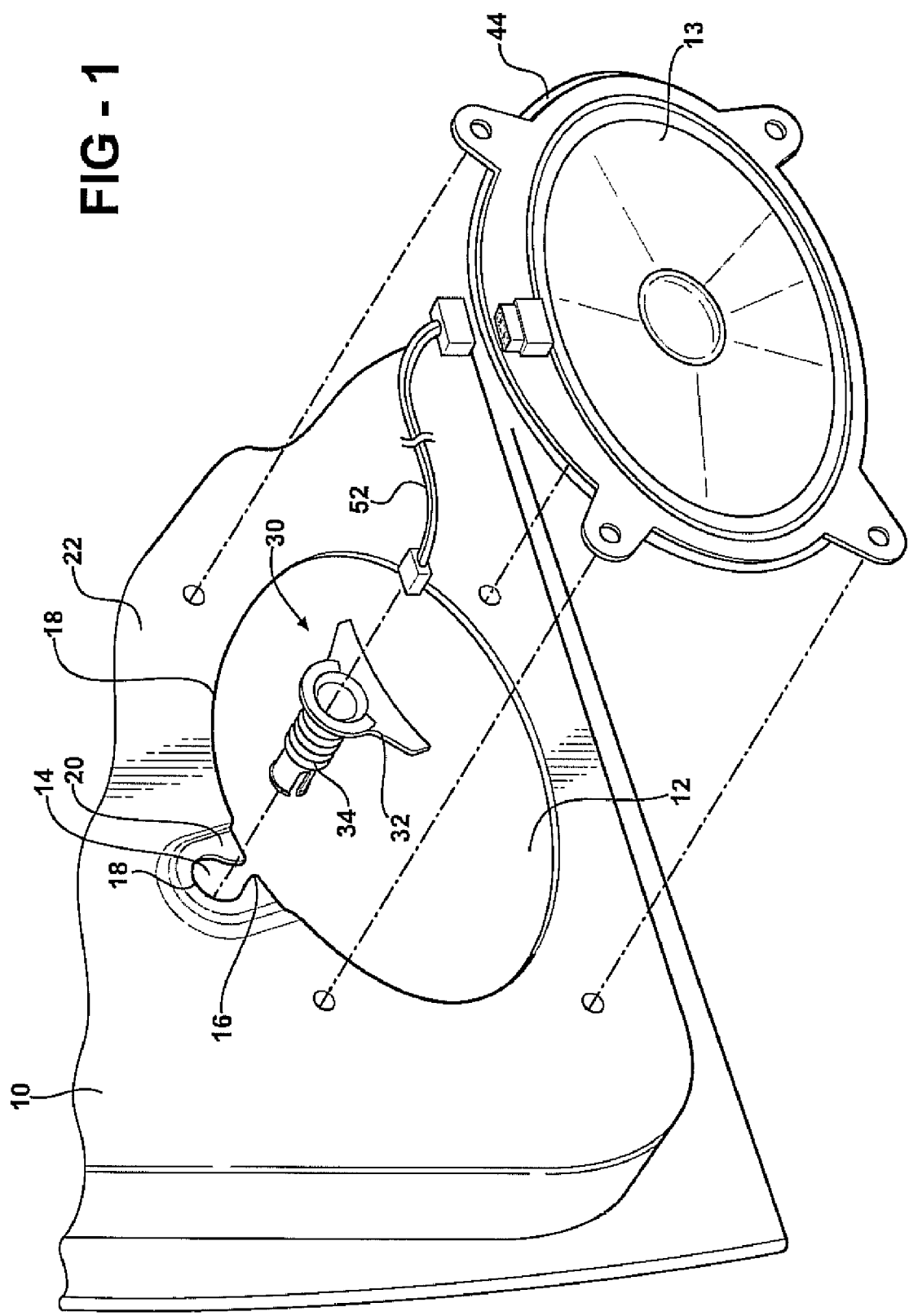
FIG. 1 is an exploded perspective view of a wire harness grommet assembly according to the invention.
Figure 2:
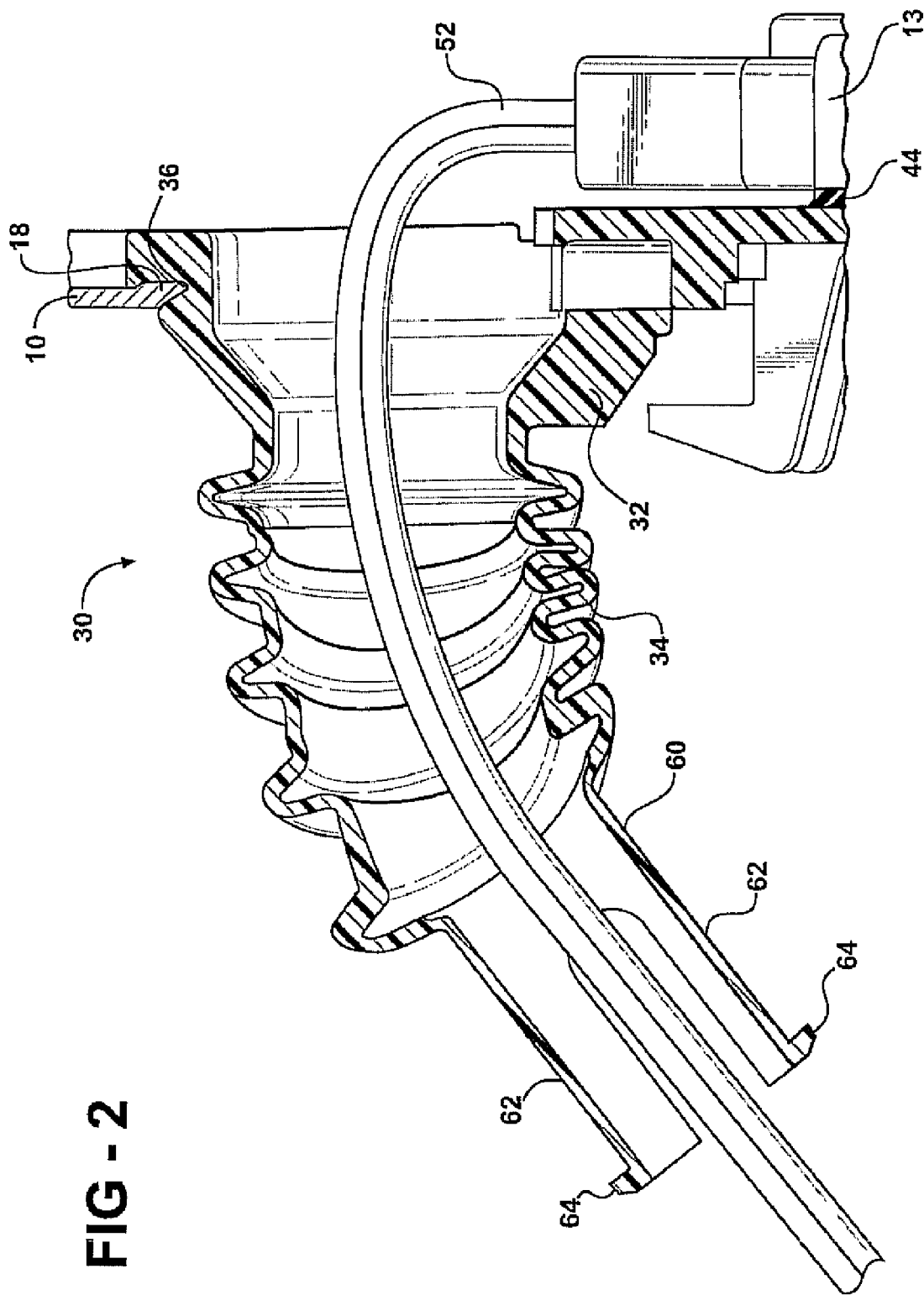
FIG. 2 is a cross sectional view of the wire harness grommet assembly.
Figure 3:
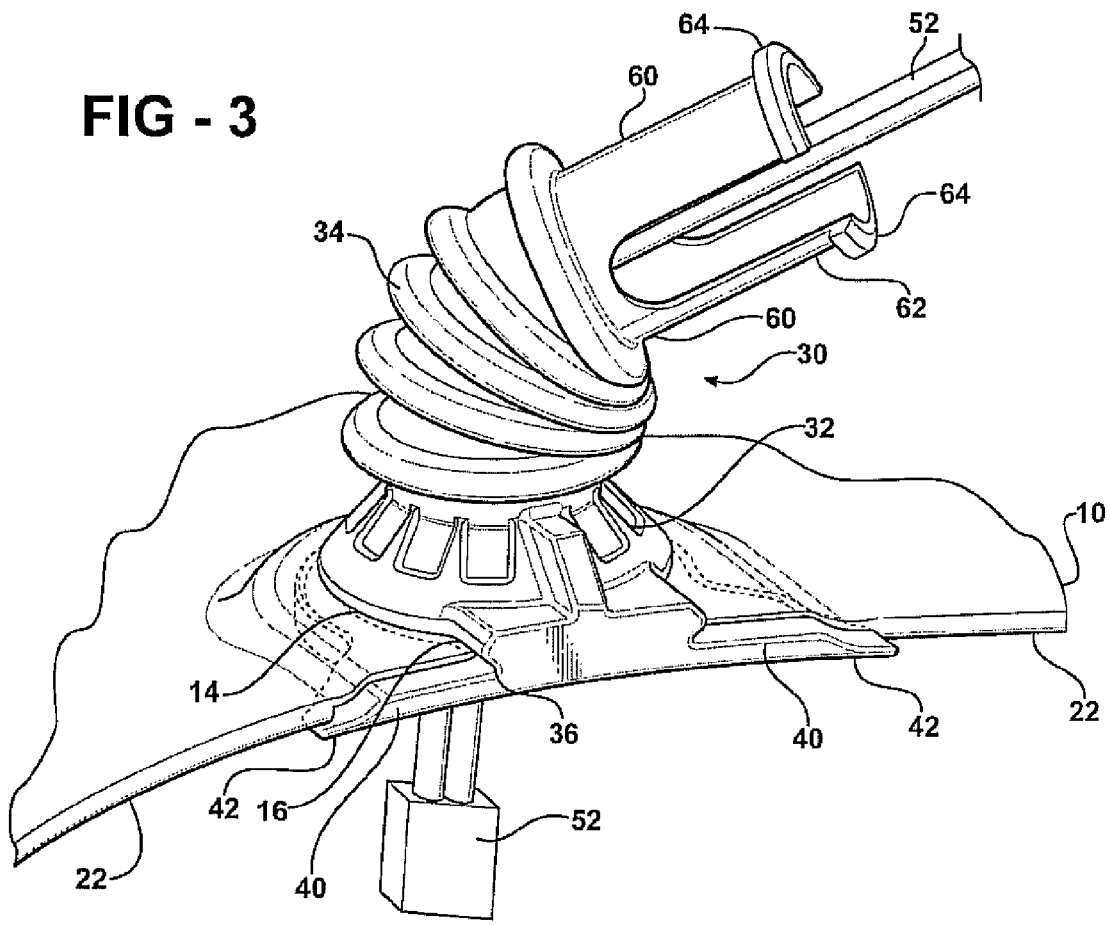
FIG. 3 is an enlarged perspective side view of the wire harness grommet assembly.
Figure 4:
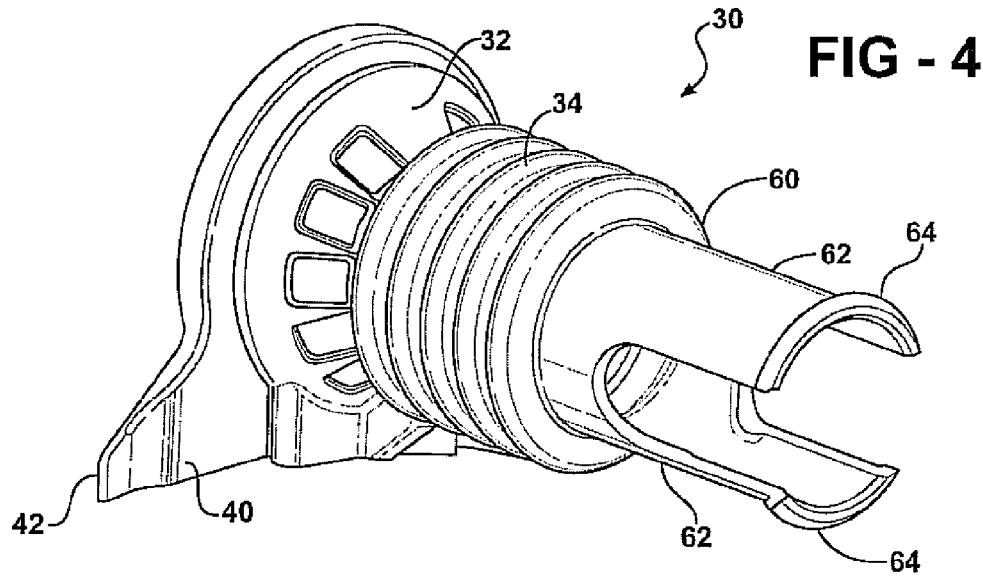
FIG. 4 is a perspective view of a grommet of the wire harness grommet assembly.

Referring to FIGS. 1-3, a sheet metal panel 10 is provided with a speaker hole 12 for receiving a speaker 13. The speaker 13 is assembled to the sheet metal panel 10 by conventional fasteners, such as screws. A second hole 14 is formed in the sheet metal panel 10 adjacent the speaker hole 12. A slot 16 extends between the speaker hole 12 and the second hole 14. The slot 16 and the second hole 14 together form a key hole shape. A peripheral edge 18 generally defines the holes 12, 14 and slot 16 formed in the sheet metal panel 10. An emboss 20 is formed in the sheet metal panel 10 and surrounds at least a portion of the second hole 14. Further, the emboss 20 is recessed relative to an outer surface 22 of the sheet metal panel 10.

A grommet is generally indicated at 30 in the figures. The grommet 30 includes an attachment portion 32 and an extension portion 34. During assembly of the grommet 30 to the sheet metal panel 10, the attachment portion 32 is inserted into the second hole 14 and slot 16. The attachment portion 32 may be inserted into the second hole 14 and slot 16 either axially or radially. Once assembled to the sheet metal panel 10, the attachment portion 32 is seated within the emboss 20. The attachment portion 32 further has a key hole shape corresponding with the slot 16 and the second hole 14 to ensure that the grommet 30 is correctly oriented and does not fall out of the emboss 20 prior to installation of the speaker 13. Other shapes may be used to ensure correct orientation of attachment portion 32 relative to the emboss 20. A notch or slit 36 is formed in the attachment portion 32 to receive the peripheral edge 18 of the sheet metal panel 10 to securely retain the grommet 30 within the emboss 20.

The attachment portion 32 also includes an outwardly extending arm 40 having an outer surface 42. The outer surface 42 of the arm 40 is substantially continuous with the outer surface 22 of the sheet metal panel 10 after the grommet 30 has been positioned within the emboss 20, so that the speaker 13 can form a seal with both the outer surface 42 and the sheet metal panel 10 to prevent water intrusion therebetween. A gasket 44 may be used between the outer surface 42, sheet metal panel 10 and the speaker 13 to facilitate formation of a water tight seal therebetween. Alternatively, the outer surface 42 of the arm 40 may protrude outwardly relative to the sheet metal panel 10, such that the attachment portion 32 is compressed between the sheet metal panel 10 and the speaker 13 to ensure formation of a seal.

The extension portion 34 of the grommet 30 includes a tube that receives a wire harness 52 from the speaker 13 therethrough. The tube 50 may be shaped like an accordion, to allow the tube 50 to be bent or angularly positioned to facilitate routing of the wire harness 52 during assembly of the speaker 13 to the sheet metal panel 10. A fastener (not shown), such as a tape tab, may be used to securely attach the wire harness 52 to the grommet 30.

A distal end 60 of the extension portion 34 has a plurality of axially extending fingers 62 with hooks 64 for locking attachment to a mating receiver (not shown) of a second tube or other structure that supports a second harness that interconnects to the wire harness 52.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A wire harness grommet assembly comprising:
   a sheet metal panel having a speaker hole for supporting a speaker therein, the sheet metal panel having an emboss formed on a peripheral edge of the speaker hole;
   a grommet having an extension portion and an attachment portion, the extension portion having a tube for supporting therein a wire harness from the speaker, the attachment portion having an outwardly extending arm, the attachment portion being disposed within the emboss so that an outer surface of the arm of the attachment portion is substantially flush and continuous with an outer surface of the sheet metal panel such that the speaker forms a seal by engaging the outer surfaces of both the arm and the sheet metal panel.

2. A wire harness grommet assembly as set forth in claim 1, wherein the attachment portion includes a slit that receives the peripheral edge to securely retain the grommet within the emboss.

3. A wire harness grommet assembly as set forth in claim 1, wherein the grommet and emboss have corresponding shapes to ensure proper orientation of the attachment portion within the emboss.

4. A wire harness grommet assembly as set forth in claim 1, wherein the attachment portion includes an arm that extends between the sheet metal panel and the audio speaker to form a seal therebetween.

5. A wire harness grommet assembly comprising:
   a sheet metal panel having a speaker hole for supporting a speaker therein, the sheet metal panel having an emboss formed on a peripheral edge of the speaker hole;
   a grommet having an extension portion and an attachment portion, the extension portion having a tube for supporting therein a wire harness from the speaker, the attachment portion being disposed within the emboss so that an outer surface of the attachment portion is substantially continuous with an outer surface of the sheet metal panel, wherein the attachment portion includes an outwardly extending arm, the arm having an outer surface that is substantially continuous with an outer surface of the sheet metal panel such that the speaker forms a seal by engaging the outer surfaces of both the arm and the sheet metal panel; and
   a gasket between the speaker and the outer surfaces of the arm and sheet metal panel to facilitate formation of a seal therebetween.

6. A wire harness grommet assembly as set forth in claim 5, wherein the tube is accordion shaped.

7. A wire harness grommet assembly as set forth in claim 6, wherein a distal end of the tube includes a plurality of fingers, each finger having a hook for lockingly attaching the grommet to a mating receiver that supports a second wire harness that interconnects with the wire harness from the speaker.

8. A wire harness grommet assembly as set forth in claim 5, wherein the attachment portion of the grommet and the emboss have corresponding shapes for positioning the attachment portion relative to the emboss.

9. A wire harness grommet assembly as set forth in claim 8, wherein the sheet metal panel includes a slot that extends between the speaker hole and the second hole, the slot and second hole forming a key hole shape that corresponds with the grommet for positioning the attachment portion relative to the emboss.

10. A wire harness grommet as set forth in claim 5, wherein the attachment portion includes a notch that receives the peripheral edge of the speaker hole to securely retain the grommet to the sheet metal part.

\* \* \* \* \*

UNITED STATES PATENT AND TRADEMARK OFFICE
CERTIFICATE OF CORRECTION

| | | |
|---|---|---|
| PATENT NO. | : 7,390,969 B2 | Page 1 of 1 |
| APPLICATION NO. | : 11/671870 | |
| DATED | : June 24, 2008 | |
| INVENTOR(S) | : Josh David Fraley et al. | |

It is certified that error appears in the above-identified patent and that said Letters Patent is hereby corrected as shown below:

Column 1, line 22 replace "tie" with --the--

Signed and Sealed this

Twenty-third Day of September, 2008

JON W. DUDAS
*Director of the United States Patent and Trademark Office*